Patented July 6, 1954

2,683,120

UNITED STATES PATENT OFFICE 2,683,120

HYDRAULIC TRANSMISSION FLUIDS

Louis A. Jennings, Mountainside, Julius J. Schlaer, Elizabeth, and William C. Howell, Jr., Union, N. J., assignors to Standard Oil Development Company, a corporation of Delaware No Drawing. Application August 29, 1950, Serial No. 182,138

3 Claims. (Cl. 252—75)

The present invention relates to hydraulic transmission fluids, and the like, and particularly to oil compositions which are especially adapted for use in power transmitting operations. It relates, more particularly, to oil compositions, preferably of light to moderate viscosity ranges, which meet the peculiar requirements of fluid couplings, hydraulically operated automatic and semi-automatic power transmission units, hydraulic torque converters, and the like.

During recent years, a number of types of clutches, drives, transmissions, and the like, have come into general use in the automotive industry. Such units depend for their efficient operation upon an oil or equivalent fluid composition which has good lubricating qualities plus the following special properties:

(1) Relatively low viscosity, to avoid objectionable drag or power consumption when power is not being transmitted; also to permit satisfactory flow through restricted passages for special types or phases of operation. In general, the viscosity of the fluid should be in the range from about 34 to about 60 S. S. U. at 210° F. For general passenger vehicle use, a viscosity range of 50 to 60 S. S. U. at 210° F. is needed, preferably 50 to 56 S. S. U. For certain types of passenger vehicle transmissions, such as torque converters which do not involve gear shifting operations, a lower viscosity fluid is also satisfactory. The minimum viscosity for satisfactory operation of such transmissions is limited by the need for maintaining adequate pump pressure in the hydraulic systems, and has been found to be approximately 36 S. S. U. at the maximum operating temperature likely to be encountered under very severe operating conditions, viz. about 300° F. This, in effect, sets a limit of about 44 S. S. U./210° F. minimum for the fluid, depending upon its viscosity index. For large heavy duty torque converter transmissions, such as are used in busses and industrial equipment, the pressurizing pump design characteristics are such that even lower viscosity fluids are sometimes permissible, fluids of 34 to 36 S. S. U./210° F. having been found to be most satisfactory for transmissions of this type.

(2) As uniform a viscosity as practicable over a wide temperature range to give uniform operation quite independently of ambient or operating temperatures. For passenger car transmissions, a high viscosity index is requisite, preferably 130 or higher, 150 or more being desirable for the best operation of some widely used units.

(3) A high degree of stability against mechanical breakdown or chemical deterioration. The components of a good hydraulic transmission oil should not break down on being subjected to severe mechanical shear. The fluid must have good resistance to oxidation and should be inhibited, if necessary, against corrosivity toward metals, sludge and gum formation, and the like.

(4) The product must be an efficient lubricant, in the sense that it reduces the friction between relatively moving mechanical elements to a practical minimum.

(5) For safety, the oil must have a reasonably high flash point. The flash point should be not less than 300° F.; 310° F. is a preferred minimum, and a minimu mof 350° F. is desirable where it can be attained consistently with the other requirements. The more volatile fluids may evaporate to an objectionable degree, especially when operating temperatures reach 200° F. or more, as frequently happens.

(6) A low freezing or pour point is essential, especially for winter operation. Since automotive transmission fluids, e. g., are not changed as frequently as crankcase lubricants, they should always be suitable for operation at the lowest operating temperatures to be expected during the year. A pour point at least as low as −20° F. is usually required and it is preferably no higher than −35° F.

It is obvious to those skilled in the art that oil compositions meeting all the foregoing requisites are difficult to obtain. Oils of petroleum origin ordinarily have relatively low flash points when they have low viscosity and low pour points. Those with high flash points and the desirable viscosity range stated above, at temperatures up to 210° F., tend to become too viscous at lower temperatures and their pour points are too high. Pour point depressants may be used, although their effectiveness is somewhat limited by the presence of other additives that may be necessary to impart specific properties to the fluid. Viscosity index improvers, several of which are in wide commercial use, may be used but they must be carefully selected to avoid mechanical or shear breakdown. Furthermore, oils of natural petroleum base may be deficient in oxidation stability, in corrosion resistance, in lubricity, as well as in pour point and viscosity index characteristics.

According to the present invention, it has been found that superior hydraulic transmission fluids can be prepared from a mixture of the fairly heavy branched chain hydrocarbons produced in the alkylation process. Especially suitable is the "bottoms" fraction of the total alkylate produced by the $C_4$ to $C_5$ alkylation of $C_3$ to $C_5$ olefins, e. g., by alkylating propene, butene, isobutene, pentene, isopentene, and the like, with isobutane or isopentane in the presence of a catalyst such as sulfuric acid, aluminum chloride, hydrogen fluoride, etc. The bottoms fraction should have a boiling point between 500° and 800° F., preferably between 600° and 750° F., and should have a high flash point, preferably at least 310° F. and desirably 350° F. or more. The alkylate "bottoms" should be fractionated to a fairly narrow boiling range to obtain the flash point characteristics desired, along with a viscosity of 34 to about 42 S. S. U. at 210° F.

A typical alkylate for the purposes of the present invention is produced by reacting isobutane with butenes and pentenes in a system using three reactors in series and employing sulfuric acid having a concentration of 88.4 to 95.0% by weight as a catalyst. This alkylate is distilled to a temperature of about 530° F. The residue or bottoms comprises about 4.3% of the total alkylate.

It is often desired to incorporate a mineral lubricating oil of a suitable type in the alkylate bottoms to obtain fluids of particular characteristics. Such mineral lubricating oil may comprise up to 80% of the total composition. For low viscosity bus torque converter fluids, the mineral lubricating oil may be an acid treated distillate. For passenger car hydraulic transmission fluids, where good viscosity-temperature characteristics are of paramount importance, a solvent extracted oil is preferred, e. g., a phenol, methyl ethyl ketone, or furfural extracted oil. Its viscosity, for general passenger automobile service, is preferably between 35 and 40 S. S. U. at 210° F., a viscosity around 36 being generally preferred. The alkylate may comprise from about 15 to about 80% of the total composition, preferably 20 to about 35% for general passenger car service. The mineral oil comprises about 18 to 80% of the total.

In order to obtain a higher viscosity and the desired high degree of uniformity in viscosity over a wide temperature range, a polymeric viscosity index improver is used which is highly effective in the alkylate compositions. A polybutene of fairly uniform molecular weight (e. g., from about 10,000 to 20,000, with only about 20% or less outside this range) is preferred because the polymers of fairly narrow molecular weight ranges have been found to be more stable against shear breakdown than those of broader weight range. Such polymers are commonly supplied as 10% to 30% concentrates in oil solutions (in a light mineral base lubricating oil). Proportions of 1 to 20% of such solutions (0.1 to 6% of actual polymer) are preferred. It will be understood, however, that other polymers and/or copolymers, e. g., of styrene-olefin, olefin-diolefin, and of ester type, such as acrylates, methacrylates, maleic or fumarate ester-vinyl acetate copolymers, etc., may be used if desired, provided they have the requisite stability and compatibility with the other ingredients.

A particular advantage of the branched chain alkylate hydrocarbons is their susceptibility, in combination with mineral oils of moderate viscosity and good viscosity index, to viscosity index improvement. For example, a straight mineral oil of original viscosity index of 60 and 38.5 S. S. U./210° F. viscosity may have its viscosity index raised to 133 by the addition of 8 weight per cent (2.2% active ingredient) of a particular commercial polybutene viscosity index improver, a gain of 73 V. I. units. When this same concentration of viscosity index improver is employed in a heavy alkylate of the type described above (49 viscosity index, 37.0 S. S. U./210° F. viscosity), the viscosity index is raised to 135, a gain of 86 V. I. units. This marked susceptibility of heavy alkylate to viscosity index improvers is not limited to the polybutene type compounds, but is evidenced as well when using other types. For example, with a commercial methacrylate ester copolymer type of viscosity index improver, the viscosity index of the heavy alkylate was raised from 49 to 148 by the addition of 2.4 weight per cent (active ingredient), a gain of 99. V. I. units, whereas the above-mentioned mineral oil was raised only 80 units (from 60 to 140) by the same concentration of this particular viscosity index improver. Thus, while the heavy alkylate per se has a viscosity index much lower than that of the mineral oil, its susceptibility to viscosity index improvers is markedly superior. The several points of viscosity index thus gained when using this type of material frequently make the difference between a satisfactory transmission fluid and one that is not entirely satisfactory.

The invention will be more fully appreciated and understood by reference to specific examples:

EXAMPLE I

A residual or "bottoms" fraction remaining after distilling a mixture of butylenes and pentylenes alkylate to a vapor temperature of 530° F. was used as the alkylate component. 20% by weight of this alkylate, having a viscosity of about 37 S. S. U. at 210° F., were combined with 61.2% of a solvent extracted neutral oil of about 36 S. S. U. viscosity at 210° F. The latter was an oil of high viscosity index (about 107). To this blend was added 12.2% of a 27% oil solution of a special polybutene of comparatively narrow molecular weight range (between 10,000 and 20,000), 4.4% of a commercial detergent inhibitor (oil solution of calcium sulfonate of high molecular weight combined with the barium salt of tertiary alkyl phenol sulfide), 1% sulfurized sperm oil, 0.4% of a commercial antioxidant and 0.8% of a commercial pour point depressant.

This product had a viscosity of 54.3 S. S. U. at 210 F., a viscosity index of 152, a flash point of 365° F., and a pour point of −30° F.

EXAMPLE II

Using 51.6% of the same mineral oil as in Example I, 30% of the alkylate bottoms and 11.8% of the same viscosity index improver in 27% oil solution, the other additives being used in precisely the same proportions as before, a product was obtained having a viscosity of 53.7 S. S. U. at 210° F., a viscosity index of 151, a flash point of 360° F. and a pour point of −35° F.

EXAMPLE III

A blend of 50.9% by weight of the same solvent extracted neutral oil, 31% of a highly refined and dewaxed mineral oil of about 38.5 S. S. U. viscosity at 210° F. and 60 viscosity index (to replace the alkylate) with other ingredients essentially the same as in Example II, gave a blend of 55.4 S. S. U. viscosity at 210° F. It had a viscosity index of 149, a flash point of 365° F. and a pour point of −35° F. In all respects, except viscosity and viscosity index, this product was about the same as Examples I and II, but it had a slightly higher viscosity and a viscosity index 2 to 3 points lower. Inasmuch as a viscosity index of 150 is about the lowest that can be used for optimum performance of some popular types of automatic transmissions, it will be seen that the numerically small difference in viscosity index is of considerable practical importance. The alkylate bottoms blend has a distinct advantage.

EXAMPLE IV

Another composition was prepared of 56.3% by weight of the same solvent extracted neutral oil (36 S. S. U. viscosity at 210° F.) described in Example I, plus 20.2% of the light highly refined oil of 38.5 S. S. U. viscosity as in Example III, and 5% of a 37 S. S. U. viscosity (at 210° F.) oil of the same highly refined type. To this blend was added 12% of the viscosity index improver solution of the previous examples. Substantially the same proportions of the other additives were employed as in Example III. This product had a viscosity of 54.8 S. S. U. at 210° F. Its viscosity index was 150.5, its flash point 365° F. and its pour point −35° F.

The data on the above four examples is summarized below:

Table I

| Composition, Weight Percent | Example I | Example II | Example III | Example IV |
|---|---|---|---|---|
| Solvent Extracted Oil 36 S. S. U | 61.2 | 51.6 | 50.9 | 56.3 |
| Heavy Alkylate Bottoms | 20.0 | 30.0 | | |
| Light Mineral Oil 38.5 S. S. U | | | 31.0 | 20.2 |
| Light Mineral Oil 37 S. S. U | | | | 5.0 |
| Viscosity Index Improver 27% Oil Solution | 12.2 | 11.8 | 11.6 | 12.0 |
| Alkyl Fumarate-Vinyl Acetate Copolymer Pour Depressant | 0.8 | 0.8 | 0.7 | 0.7 |
| Detergent Inhibitor | 4.4 | 4.4 | 4.4 | 4.4 |
| Sulfurized Sperm Oil (to improve oiliness and film strength) | 1.0 | 1.0 | 1.0 | 1.0 |
| Antioxidant | 0.4 | 0.4 | 0.4 | 0.4 |
| Antifoam Agent | Trace | Trace | Trace | Trace |
| Inspections: | | | | |
| Vis. at 210° F., S. S. U | 54.8 | 53.7 | 55.4 | 54.8 |
| Viscosity Index | 152.0 | 151.0 | 149.0 | 150.5 |
| Flash Point, °F | 365.0 | 360.0 | 365.0 | 365.0 |
| Pour Point, °F | −30 | −35 | −35 | −35 |

In all these examples, the sulfurized sperm oil was added to improve the oiliness of the blend. Certain types of automatic transmissions used in passenger automobiles tend to become noisy in operation without addition of some oiliness agent. In other units this is not always necessary but it is considered desirable to use at least 0.1 to 3 or 4 per cent of such an agent. Other sulfurized fats may be substituted.

EXAMPLE V

Another composition was prepared using 79.0% of the alkylate bottoms and 18.6% of an acid-treated distillate from naphthenic crude of about 40 S. S. U. viscosity at 100° F., plus 2.0% of a commercial detergent inhibitor, 0.2% of a commercial antioxidant and 0.2% of a commercial pour depressant.

This product had a viscosity of 35.7 S. S. U. at 210° F., a viscosity index of 75, a flash point of 320° F. and a pour point of −40° F.

EXAMPLE VI

Another blend was prepared identical in composition to that of Example V except that a light solvent extracted coastal oil of about 36.6 S. S. U./210° F. viscosity and 55 viscosity index was substituted for the alkylate bottoms.

This product had a viscosity of 35.3 S. S. U. at 210° F., a viscosity index of 69, a flash point of 315° F. and a pour point of −35° F.

The data on the compositions of Examples V and VI are summarized below:

Table II

| Composition, Weight Percent | Example V | Example VI |
|---|---|---|
| Acid-Treated Mineral Oil | 18.6 | 18.6 |
| Heavy Alkylate Bottoms | 79.0 | |
| Solvent Extracted Mineral Oil | | 79.0 |
| Detergent Inhibitor | 2.0 | 2.0 |
| Antioxidant | 0.2 | 0.2 |
| Pour Depressant | 0.2 | 0.2 |
| Inspections: | | |
| Viscosity at 210° F., S. S. U | 35.7 | 35.3 |
| Viscosity Index | 75 | 69 |
| Flash Point, °F | 320 | 315 |
| Pour Point, °F | −40 | −35 |

Products of such low viscosity index are, as noted above, suitable for certain types of heavy duty operation where good viscosity index is not of importance as where operating temperatures are reasonably constant. For general passenger car use they are not as satisfactory as products of the preceding examples.

The $C_4$ and $C_5$ alkylate bottoms described in Examples I and II were further distilled to obtain a cut having a kinematic viscosity of 500 S. S. U. at 0° F. with a flash point of 280° F. minimum. This product had a pour point of −50° F. maximum and comprised from 6.87 to 9.9% of the total alkylate. It was blended with the mineral oils described above to obtain hydraulic fluid blends.

The use of alkylate bottoms, which are available in quantity and are quite inexpensive, being by-products of synthetic aviation gasoline, is a salient aspect of the present invention. For some purposes, as in the heavy duty torque converters used in certain busses where lower viscosity and viscosity index fluids are permissible, they may be used without viscosity index improvers. They may be so used either straight or with one or more additives, but it is preferred to blend them in the proportions previously indicated.

The usual conventional additives may be used in normal proportions, as will be understood by those skilled in the art. Antioxidants from 0.01 to about 1 or 2%, viscosity index improvers of the specific types described above in proportions of 0.1 to 6%, pour depressants 0.01 to 1%, detergents 0.5 to 10%, and oiliness agents and/or extreme pressure additives, which may be considered film strengthening agents, generically, 0.1 to 4%, may be added. These proportions are based, in all cases, on the active ingredients.

It should also be noted that the alkylate bottoms may be blended with various components of mineral oils and/or vegetable oils, such as castor oil, for example. Where necessary, some of the higher alcohols or other mutual solvents may be added to improve miscibility of the several ingredients.

What is claimed is:

1. A hydraulic oil composition having the approximate formula by weight:

51.6 to 61.2% solvent extracted mineral oil of about 36 S. S. U. viscosity at 210° F. and viscosity index of about 107,
20 to 30% of mixed butylene-pentylene alkylate having a viscosity of about 37 S. S. U. at 210° F., a flash point of at least 350° F. and a boiling range between 600° and 750° F.,
11.8 to 12.2% of a 27% oil solution of polybutene of molecular weight range substantially between 10,000 and 20,000, not more than 20% by weight of polymer being outside said range,
4.4% of a mixed barium alkyl phenol sulfide and high molecular weight calcium sulfonate in oil,
1% sulfurized sperm oil,
0.4% oxidation inhibitor said composition having a flash point of about 360°–365° F. and a pour point not higher than −20° F.

2. A hydraulic transmission fluid comprising about 20–30% by weight, based on the total composition, of a $C_4$–$C_5$ isoparaffin alkylated olefinic hydrocarbon composition of boiling range between 600° and 750° F., flash point of at least 310° F. and viscosity of 34–42 S. S. U. at 210° F., about 60–70% by weight of a high viscosity index solvent extracted mineral lubricating oil of about 35–40 S. S. U. at 210° F., a sufficient quantity, within the range of about 0.1–6% by weight of a mechanically stable polybutene viscosity index improver to bring the viscosity index of the composition to at least 150, and the viscosity to between 50 and 60 S. S. U. at 210° F., said polybutene having a molecular weight range within the limits of about 10,000 to about 20,000, not more than 20% by weight of the polymer being outside such range, 0.5–10% by weight of an alkaline earth metal alkyl phenol sulfide-alkaline earth metal sulfonate detergent, and about 1% of a sulfurized sperm oil as an oiliness agent, said fluid having a flash point of at least 350° F. and a pour point not higher than −20° F.

3. Composition according to claim 2 wherein there is also incorporated about 0.4% of an antioxidant.

References Cited in the file of this patent

UNITED STATES PATENTS

| Number | Name | Date |
|---|---|---|
| 1,928,956 | Tatter | Oct. 3, 1933 |
| 2,398,943 | Kollen | Apr. 23, 1946 |
| 2,408,983 | Kollen | Oct. 8, 1946 |
| 2,504,552 | Lewis | Apr. 18, 1950 |
| 2,509,620 | Watson et al. | May 30, 1950 |